(12) United States Patent
Tamburro

(10) Patent No.: US 11,419,322 B1
(45) Date of Patent: Aug. 23, 2022

(54) FISHING LURE WITH HANGING BLADE

(71) Applicant: Freedom Tackle Corp., Weston (CA)

(72) Inventor: Michael Tamburro, Weston (CA)

(73) Assignee: Freedom Tackle Corp., Weston (CA)

( * ) Notice: Subject to any disclaimer, the term of this patent is extended or adjusted under 35 U.S.C. 154(b) by 383 days.

(21) Appl. No.: 16/740,185

(22) Filed: Jan. 10, 2020

(51) Int. Cl.
*A01K 85/18* (2006.01)

(52) U.S. Cl.
CPC .................. *A01K 85/18* (2013.01)

(58) Field of Classification Search
CPC ..... A01K 85/14; A01K 85/18; A01K 85/1883
USPC ....................................... 43/42.11
See application file for complete search history.

(56) References Cited

U.S. PATENT DOCUMENTS

| | | | | |
|---|---|---|---|---|
| 1,707,407 A * | 4/1929 | Miles | ...... | A01K 85/18 |
| | | | | 43/42.4 |
| 2,721,414 A * | 10/1955 | Ross | ...... | A01K 85/14 |
| | | | | D22/131 |
| 3,834,058 A * | 9/1974 | Gaunt | ...... | A01K 85/14 |
| | | | | 43/42.49 |
| 4,142,319 A * | 3/1979 | Mihaljevic | ...... | A01K 85/14 |
| | | | | 43/42.49 |
| 4,936,041 A * | 6/1990 | Couture | ...... | A01K 85/14 |
| | | | | D22/129 |
| 7,621,068 B1 * | 11/2009 | Renosky | ...... | A01K 85/16 |
| | | | | 43/42.49 |
| 8,151,513 B2 * | 4/2012 | Grimaldi | ...... | A01K 85/00 |
| | | | | 43/42.36 |
| 10,426,149 B1 * | 10/2019 | Coxey | ...... | A01K 85/14 |
| 10,477,845 B1 * | 11/2019 | Davis | ...... | A01K 85/18 |
| 2012/0096757 A1 * | 4/2012 | Langer | ...... | A01K 85/18 |
| | | | | 43/42.49 |
| 2014/0196353 A1 * | 7/2014 | Parks | ...... | A01K 85/14 |
| | | | | 43/42.02 |
| 2016/0106081 A1 * | 4/2016 | Thorne | ...... | A01K 91/04 |
| | | | | 43/42.39 |
| 2018/0007876 A1 * | 1/2018 | Senter | ...... | A01K 85/14 |
| 2019/0029239 A1 * | 1/2019 | Schwartz | ...... | A01K 85/14 |
| 2019/0216067 A1 * | 7/2019 | Naig | ...... | A01K 85/01 |
| 2020/0344986 A1 * | 11/2020 | Queen | ...... | A01K 85/14 |

FOREIGN PATENT DOCUMENTS

| | | | | |
|---|---|---|---|---|
| CA | 2923919 A1 * | 9/2011 | ............. | A01K 85/01 |
| FR | 2652991 A1 * | 10/1989 | | |
| FR | 2724091 A1 * | 3/1996 | ............. | A01K 83/06 |
| FR | 2908596 A1 * | 5/2008 | ............. | A01K 85/18 |
| WO | WO-2007002287 A2 * | 1/2007 | ............. | A01K 85/00 |

* cited by examiner

*Primary Examiner* — Christopher P Ellis
(74) *Attorney, Agent, or Firm* — Andrew Tuggle; Stephen H. Hall; Bradley Arant Boult Cummings LLP

(57) ABSTRACT

An improved fishing lure with hanging blade is provided. The lure with hanging blade comprises a body with front hook and rear hook. Between the front hook and the rear hook, a blade hangs from the floating body. The blade is shaped to impart fish-attracting motion to the floating stickbait with hanging blade. The blade attaches to the body by a blade support pin. The blade, pin, body, and hooks are sized and positioned (i) to create fish attracting sound, and (ii) to avoid interfering with hookup with a fish. The blade can be shaped asymmetrically to impart an erratic fish-attracting motion to the floating stickbait with hanging blade as it is retrieved.

19 Claims, 13 Drawing Sheets

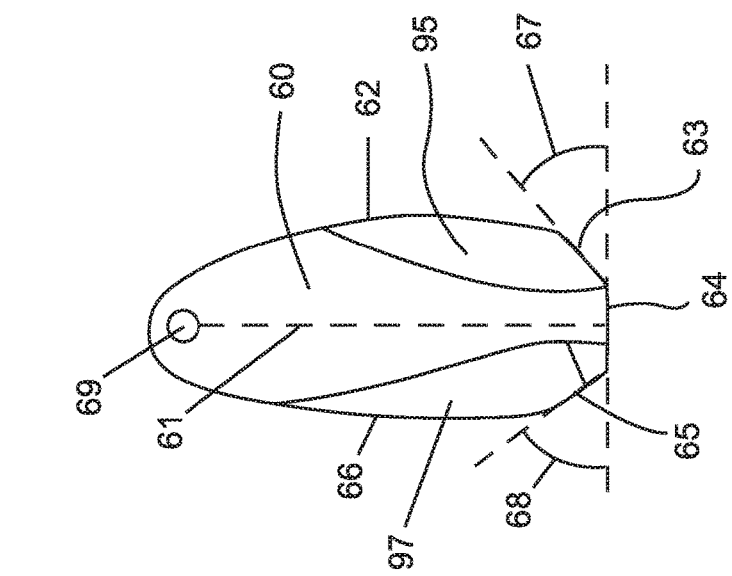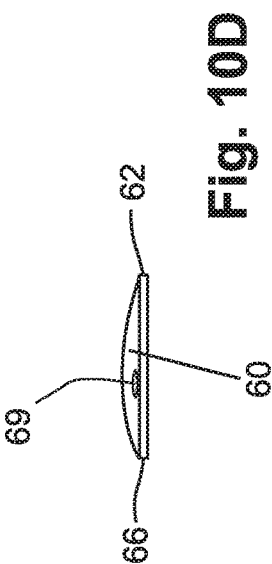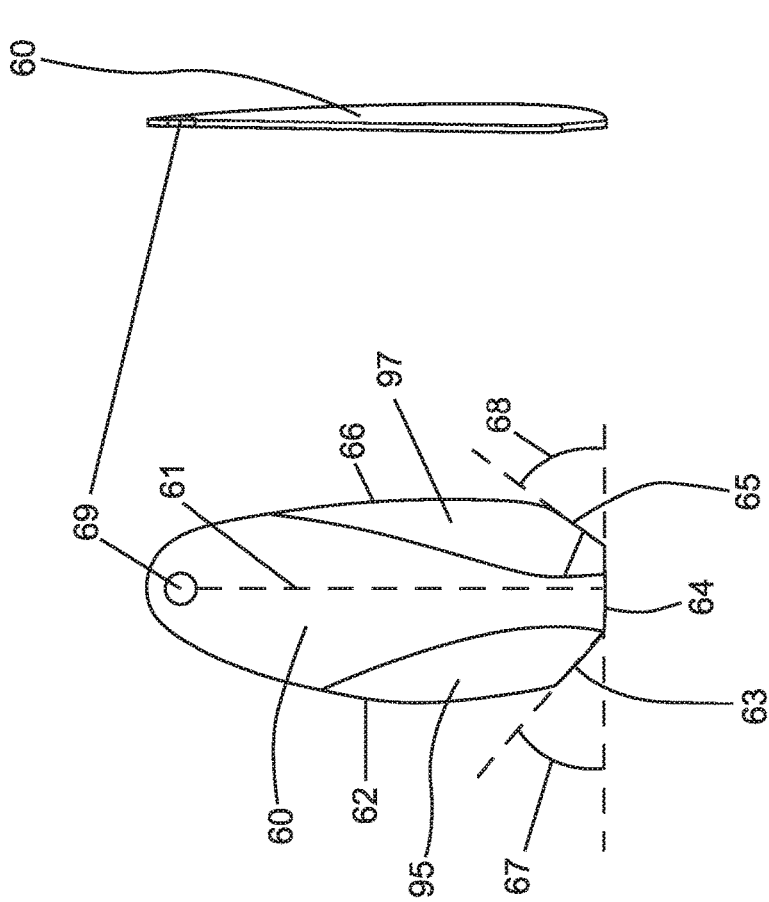

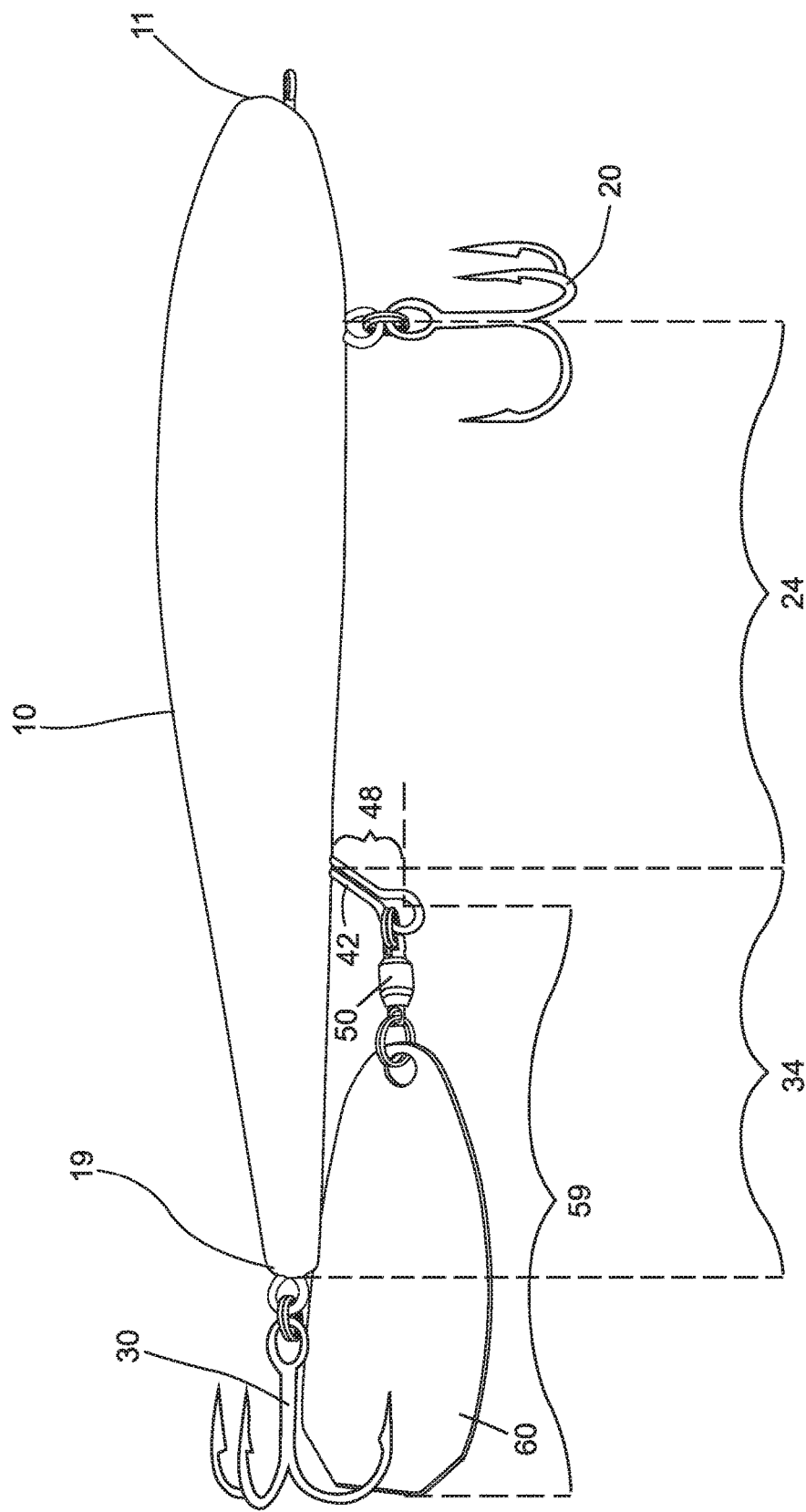

FISHING LURE WITH HANGING BLADE

This disclosure relates to fishing lures and methods of making fishing lures. More particularly, this disclosure relates to fishing lures with a blade descending from the lure that is connected to the lure by a swivel (or other attachment means) and that causes the lure to move erratically as it is retrieved.

BACKGROUND

Fishing lures often include various features and components to impart motion, vibration, sound, and flash that may attract fish. These disturbances can provide many benefits, such as mimicking natural prey, allowing predatory fish to detect the fishing lure at a greater distance, and triggering otherwise inactive (or non-feeding) fish to strike.

One example is the floating stickbait. This lure traditionally comprises a floating lure that is pulled along the top of the water to mimic natural prey. A floating stickbait often comprises a cylindrical or minnow-shaped body either of hard plastic or of soft plastic. Usually, at one end of the body is a mechanism, such as an eyelet, a snap, or a split ring, for securing the floating stickbait to an angler's fishing line. Hooks-single, double, or treble-usually descend from the body of the lure. When the floating stickbait is retrieved over the water, the lure can be made to mimic natural prey. Although such lures have proven effective in certain situations, various challenges and drawbacks remain.

One challenge is that floating stickbaits tend to move in a straight line when retrieved, which does not mimic the movements of natural prey. A handful of factors contribute to this characteristic, including that the attachment is located at the front of the lure. Anglers need to practice a long time to get the bait to zig and zag over the water. If the bait simply moves in a straight line over the water, it is often not as effective in attracting fish.

Another challenge is that, even if an angler succeeds in controlling the floating stickbait such that it zigs and zags over the water, the repetitive motion still does not mimic natural prey in a way to attract fish. Another challenge is that, comprising a single piece of plastic, floating stickbaits often do not produce flash or vibration like that of some other lures.

Many designs also fail to produce appreciable amounts of sound, which comes mostly from the sound of the floating stickbait disturbing the water. In some cases, the floating stickbait produces almost no sound because the body is hydrodynamically shaped and moves over the water without splashing.

A need therefore exists for a floating stickbait with hanging blade and a method of making a floating stickbait with hanging blade that can be effectively fished even by a novice angler. Advantageously, the floating stickbait with hanging blade will move erratically over the water such that it mimics the motions of natural prey, even when retrieved by a novice angler. Of particular advantage is the possibility of differently-shaped blades to impart different motions to the floating stickbait with hanging blade as it is retrieved over the water. For example, an asymmetrical blade may resist the flow of water differently on different portions of the blade, causing the floating stickbait with hanging blade to move from side to side as it is retrieved over the water. One skilled in the art will recognize other ways to form the blade to impart other motions to the floating stickbait with hanging blade as it is retrieved over the water.

Additionally, such a blade could be combined with other known fishing lures that are not floating stickbaits. Such a blade could be shaped to impart distinctive motions to, for examples, jerkbaits, crankbaits, spinnerbaits (inline or overhead), or jigs. In particular, an asymmetrical blade imparts fish-attracting erratic motion to inline and overhead spinnerbaits. So it is advantageous to have such asymmetrical blades even separate and apart from a floating stickbait.

In addition, the floating stickbait with hanging blade will create flash. For example, if the blade is made of a shiny, reflective material such as metal or plastic, then as the blade moves through the water, the blade will shimmer and flash, attracting fish.

Preferably, the floating stickbait with hanging blade will have a configuration that produces detectable sounds beyond that of the vibration of a rotating blade. For examples, the blade may be sized and positioned such that the blade periodically knocks against the hooks or body as the floating stickbait with hanging blade is retrieved. More preferably, the blade may be sized and positioned to create sound without tangling in the hooks or interfering with the hookup of a fish. Also preferably, the floating stickbait will have configurations in many different sizes and shapes without changing the essential action of the floating stickbait with hanging blade.

SUMMARY OF THE INVENTION

The present disclosure describes a floating stickbait with hanging blade and methods for making the floating stickbait with hanging blade. Advantageously, embodiments of the floating stickbait with hanging blade are configured to impart erratic motion that mimics the motion of natural prey. Embodiments include configurations of the floating stickbait with hanging blade that generate a distinct fish-attracting sound. Preferably, embodiments of the floating stickbait with hanging blade may also allow for varying the size and shape without changing the action of the floating stickbait with hanging blade. Embodiments of the invention may satisfy one or more, but not necessarily all, of the needs and capabilities discussed throughout this disclosure.

In a first exemplary embodiment, a fishing lure is provided and comprises a floating, hard-plastic body, wherein the body is between approximately 3.0 inches and approximately 5.0 inches long, and wherein the body is shaped such that the body resembles a minnow; a front hook attached to the body proximate a front end of the body, wherein a first distance from the front hook to the front end of the body is less than 1 inch; a rear hook attached to the body at a rear end of the body; a support pin attached to a bottom of the body between the rear hook and the front hook, wherein the support pin is positioned a second distance from the rear end of the body that is between approximately 20% and approximately 40% of a first length of the body, wherein the support pin makes a rearward angle with the body of between approximately 45 degrees and approximately 55 degrees, and wherein a second length of the support pin is between approximately 0.30 inches and approximately 0.60 inches; a swivel attached to the bottom of the blade support pin; a blade attached to the bottom of the swivel, wherein the blade is asymmetrical with respect to a blade centerline; and one or more ballast weights proximate the front end of the body.

In a second exemplary embodiment, a fishing lure is provided and comprises a floating body, wherein the body is between approximately 2.0 inches and approximately 10 inches long; a front hook attached to the body proximate a body front end; a rear hook attached to the body at a body rear end; a support pin attached to the bottom of the body between the rear hook and the front hook, wherein the support pin is positioned nearer the rear hook than the front hook, and wherein the support pin makes a rearward angle with the body that is not greater than approximately 90 degrees; a blade attached to the support pin, wherein the blade is cupped, and wherein the blade is asymmetrical with respect to a blade centerline.

In a third exemplary embodiment, a fishing lure is provided and comprises a body; a front hook attached to the body; a rear hook attached to the body; a support pin positioned between the front hook and rear hook; and a blade attached to the support pin.

In a fourth exemplary embodiment, a fishing lure is provided and comprises a hard plastic body shaped like a minnow and having a front hook descending from the bottom of the body near the front end of the body, wherein the front hook is a treble hook; a rear hook descending from the rear end of the body, wherein the rear hook is a treble hook; a blade support pin affixed to the bottom of the body between the front hook and the rear hook; and a blade having a mounting through hole, wherein the blade is asymmetrical due to differently angled notches on either side of the centerline of the blade's profile, and wherein the blade descends from and is attached to the blade support pin by a swivel. Preferably, the hooks, the blade support pin, the swivel, and the blade are dimensioned and positioned to allow the blade both to move freely below the body and to avoid tangling with the hooks and body. More preferably, the hooks, the blade support pin, the swivel, and the blade are dimensioned and positioned to allow the blade to periodically knock against the body or rear hook when retrieved.

In a fifth exemplary embodiment, a fishing lure is provided and comprises a hard plastic body shaped like a minnow and having a front hook descending from the bottom of the body near the front end of the body, wherein the front hook is a treble hook; a rear hook descending from the rear end of the body, wherein the rear hook is a treble hook; a blade support pin affixed to the bottom of the body between the front hook and the rear hook; and a blade having a mounting through hole, wherein the blade is asymmetrical due to differently curved sides on either side of the centerline of the blade's profile, and wherein the blade descends from and is attached to the blade support pin by a swivel. Preferably, the hooks, the blade support pin, the swivel, and the blade are dimensioned and positioned to allow the blade both to move freely below the body and to avoid tangling with the hooks and body or interfering with hookup with a fish. More preferably, the hooks, the blade support pin, the swivel, and the blade are dimensioned and positioned to allow the blade to periodically knock against the body or rear hook when retrieved.

In a sixth exemplary embodiment, a fishing lure is provided and comprises a plastic body having a front hook descending from the bottom of the body near the front end of the body; a rear hook descending from the rear end of the body; a blade support pin affixed to the bottom of the body between the front hook and the rear hook; and a blade having a mounting through hole, wherein the blade is shaped to impart a fish-attracting motion to the floating stickbait with hanging blade, and wherein the blade descends from and is attached to the blade support pin by the mounting through hole. Preferably, the hooks, the blade support pin, and the blade are dimensioned and positioned to allow the blade both to move freely below the body and to avoid tangling with the hooks and body or interfering with hookup with a fish.

The above summary presents a simplified overview to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

The following drawings are attached to and form a portion of this disclosure:

FIG. 10A: A front view of the blade of FIG. 9A.

FIG. 10B: A side view along the long side of the blade of FIG. 9A.

FIG. 10C: A back view of the blade of FIG. 9A.

FIG. 10D: A side view along the short bottom side of the blade of FIG. 9A.

FIG. 12B: A side view of the floating stickbait with hanging blade of FIG. 12A showing the rear hook, blade, and blade swivel oriented as they might be when the blade knocks against the body and/or rear hook.

DEFINITIONS

Figure 1:
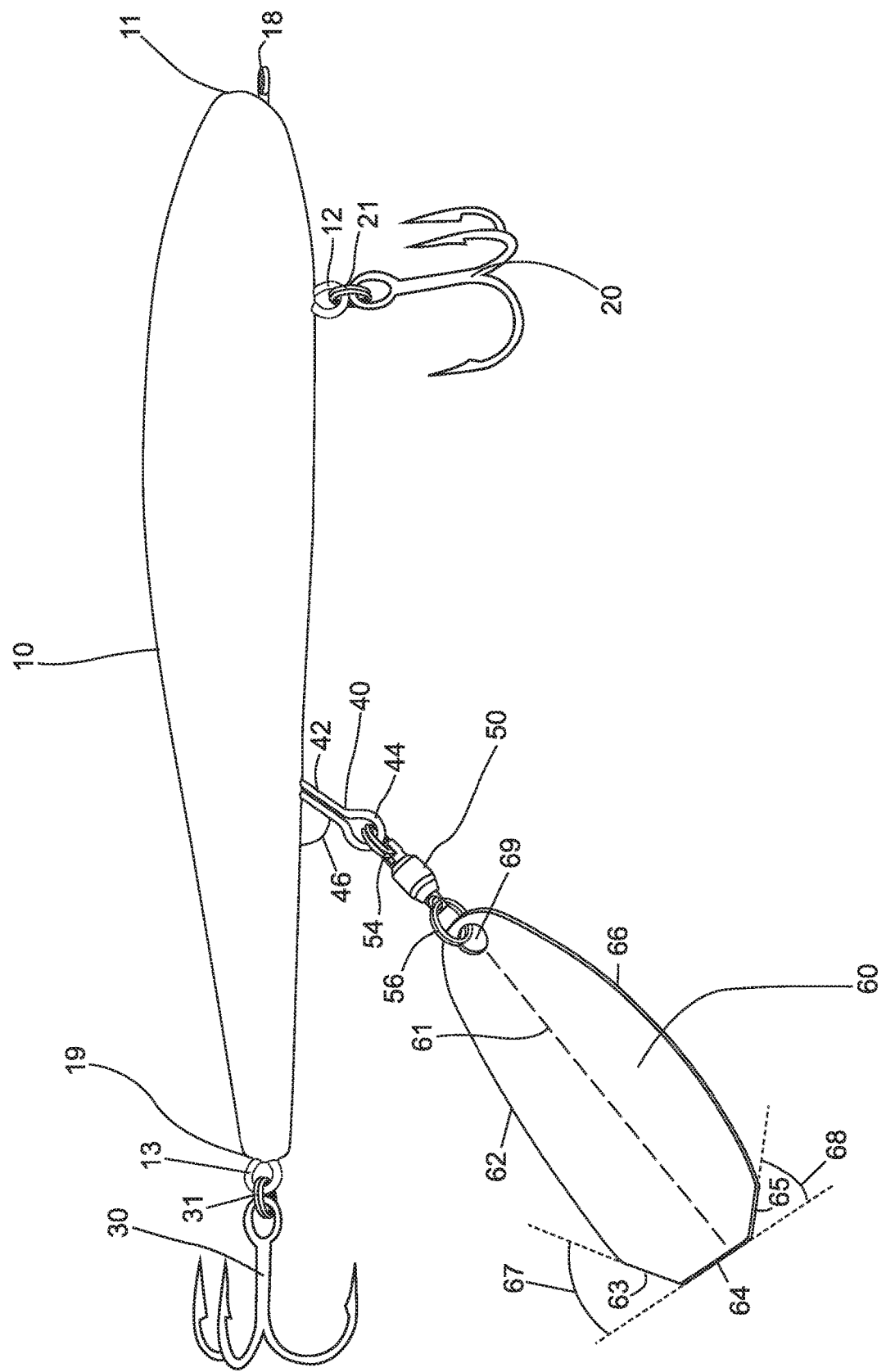
FIG. 1: A perspective view of one embodiment of the floating stickbait with hanging blade.
Figure 2:
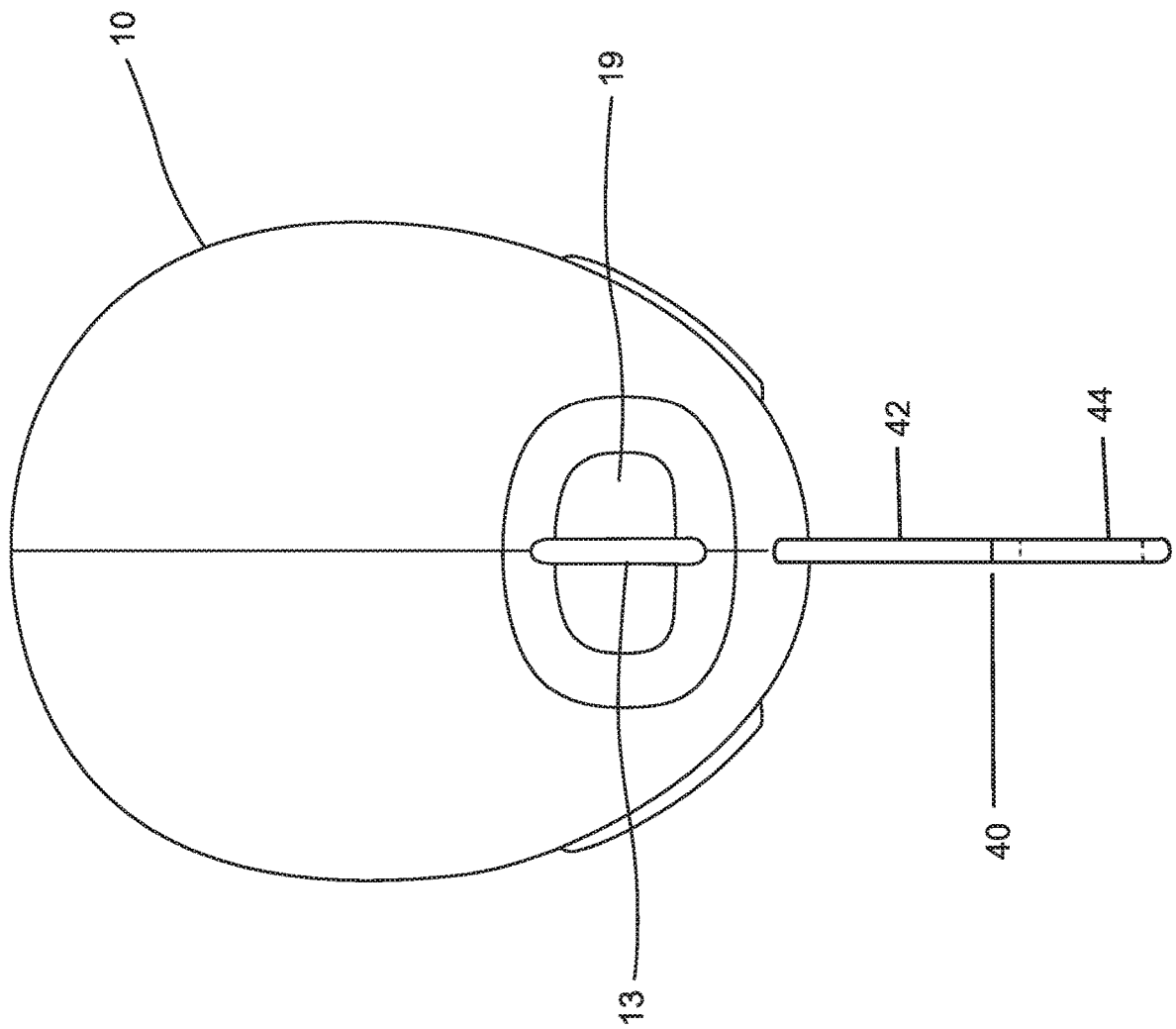
FIG. 2: A rear view of the body and blade support pin of one embodiment of the floating stickbait with hanging blade.
Figure 3:
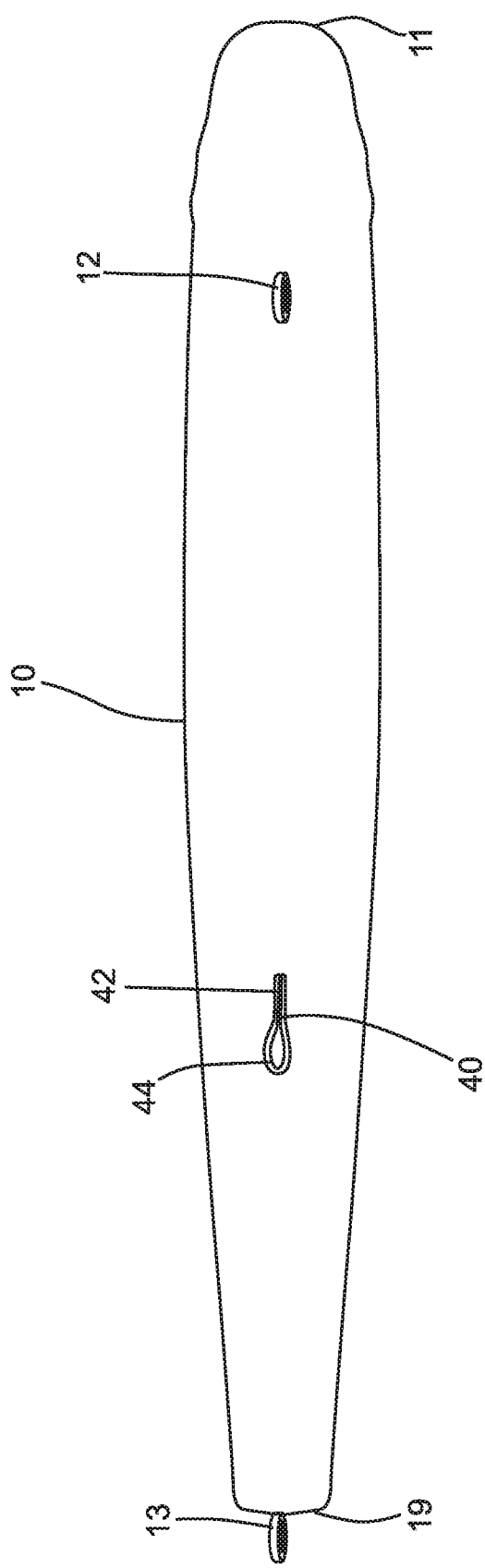
FIG. 3: A bottom view of the body and blade support pin of the floating stickbait with hanging blade of FIG. 2.
Figure 4:
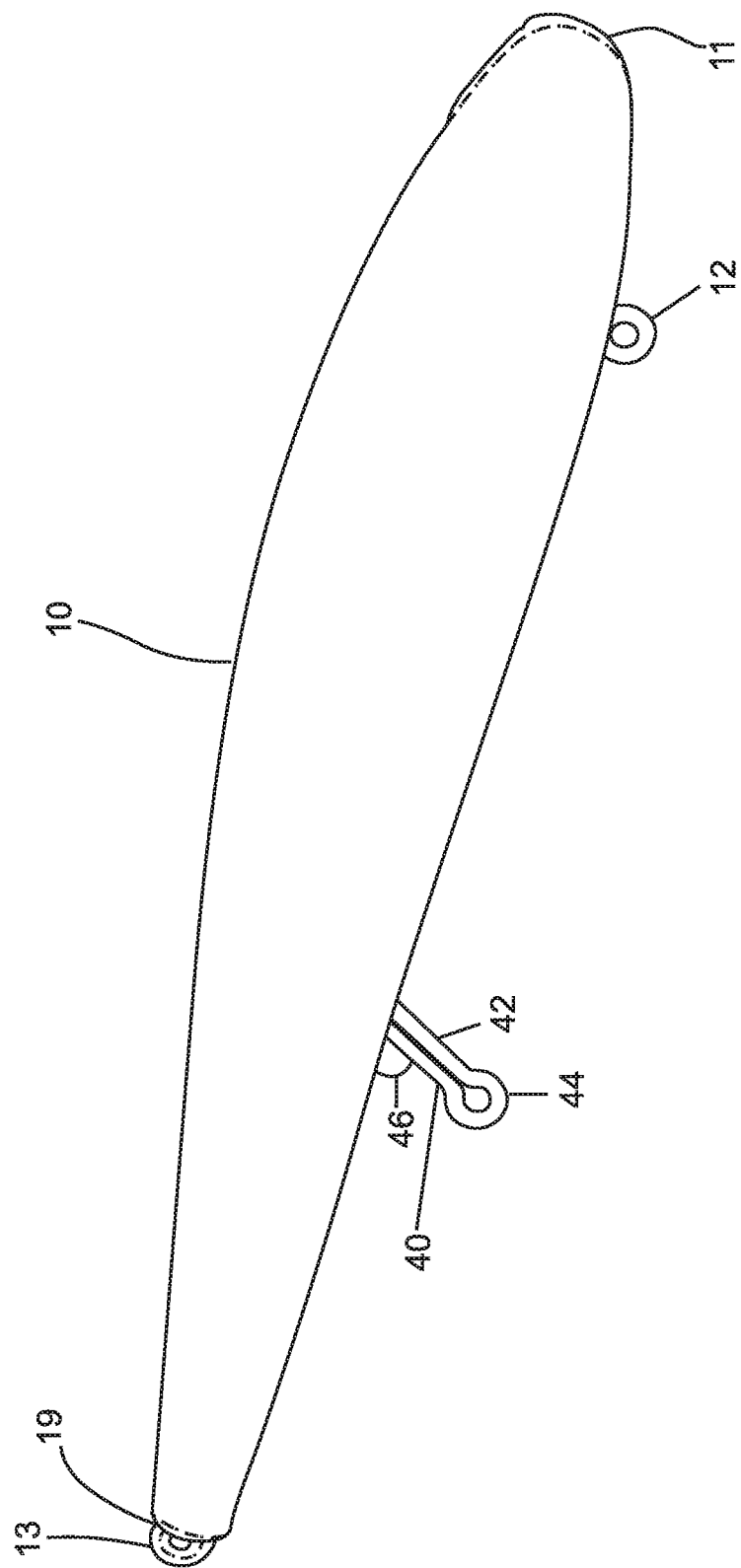
FIG. 4: A perspective view of the body and blade support pin of the floating stickbait with hanging blade of FIG. 2.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. Well known functions or constructions may not be described in detail for brevity or clarity.

The terms "about" and "approximately" shall generally mean an acceptable degree of error or variation for the quantity measured in light of the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a", "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a left could be a right, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed, but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

A floating stickbait with hanging blade and methods of making a floating stickbait with hanging blade have been developed and are described. As shown in the drawings, we generally discuss embodiments of the floating stickbait with hanging blade that have a hard-plastic, minnow-shaped body and treble, rather than single, hooks. These specific details, however, are unimportant to the teachings of the disclosure. Variations could be advantageously combined with any existing variations of floating stickbait body, such as those with soft plastic bodies, non-minnow-shaped bodies, with single or double hooks, or with other features like rattles, scents, or propeller blades. In other words, the teachings of this disclosure may be advantageous for use with a fishing lure where it is desirable to attach to the body a hanging blade that imparts motion to the lure when it is retrieved.

It should also be recognized that some unique and novel aspects of this disclosure can be utilized in non-stickbait lures, for examples: jerkbaits, crankbaits, spinnerbaits (overhead or inline), jigs, etc. Many of these other lures may have bills or lips so the lure dives. Some of these lures are inherently buoyant while others sink or have neutral buoyancy. Without limiting the generality of the foregoing, a jerkbait (as just one example) could utilize the same hanging blade as shown in the other disclosed embodiments by adding a lip to the embodiments shown in the figures.

Various exemplary embodiments of various aspects of the floating stickbait with hanging blade are shown in FIGS. 1-12. In the embodiment shown in FIG. 1, the floating stickbait with hanging blade may comprise a body 10, a front hook 20, a rear hook 30, a blade support pin 40, a blade swivel 50, and a blade 60. In greater detail, the body 10 may be attached to a fishing line (not shown) at the line attachment mechanism 18, which may be secured to the body 10 at the line anchor 78 (shown in FIG. 5). The front hook 20 may attach to the body 10 by the front hook attachment mechanism 12, which may be secured to the body 10 at the front hook anchor 72 (shown in FIG. 5). Likewise, the rear hook 30 may attach to the body 10 by the rear hook attachment mechanism 13, which may be secured to the body 10 at the rear hook anchor 73 (shown in FIG. 5). Optionally, a front hook coupler 21, like a split ring, may be used to couple the front hook 20 to the front hook attachment mechanism 12. Likewise optionally, a rear hook coupler 31, like a split ring, may be used to couple the rear hook 30 to the rear hook attachment mechanism 13.

Figure 5:
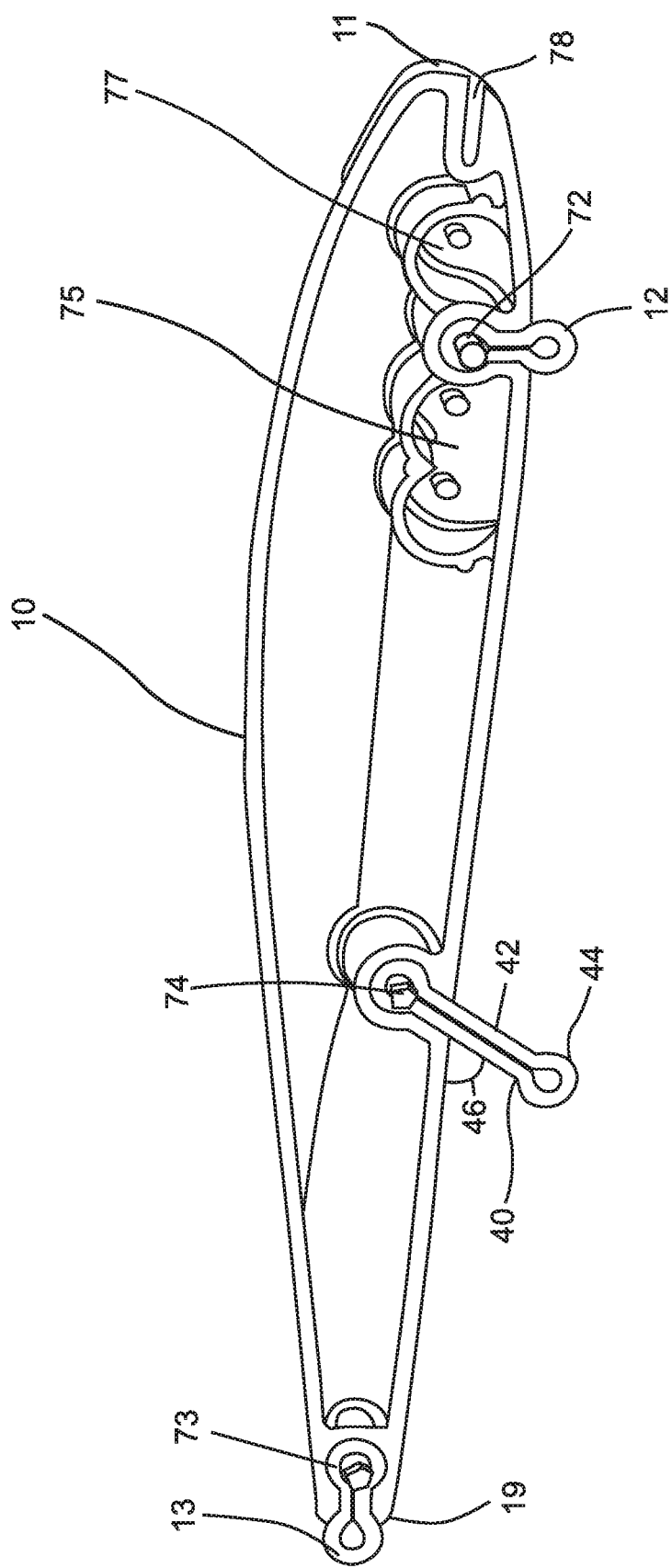
FIG. 5: A cutaway side view of the body and blade support pin of one embodiment of the floating stickbait with hanging blade.

Further, in this exemplary embodiment—and referring to FIGS. 1, 9A-D, and 10A-D-a blade 60 may be attached to the body 10 by the blade support pin 40, which may be secured to the body 10 at the blade anchor 74 (shown in FIG. 5). The blade support pin 40 may comprise a closed section (the blade support pin bar 42) and an open section (the blade support pin eye 44) and extend from the bottom of the body 10 at a blade support pin angle 46. Preferably the blade support pin 40 remains fixed during use, but in other embodiments the blade support pin 40 might not remain fixed. Optionally, a blade swivel 50 may be used to couple the blade 60 to the blade support pin 40. In that case the swivel pin ring 54 may couple the blade swivel 50 to the blade support pin 40 through the blade support pin eye 44, and the swivel blade ring 56 may couple the blade swivel 50 to the blade 60 through the blade through hole 69.

Further, in this exemplary embodiment, the blade 60 may be a cupped, rigid sheet. In greater detail, the blade 60 may be bounded by a left blade edge 62, optionally a left blade chamfer 63, a bottom blade edge 64, optionally a right blade chamfer 65, and a right blade edge 66. In some embodiments the left blade chamfer 63 may be separated from the right blade chamfer 65 by a blade shoe length. The blade 60 also may have, proximate the upper end of the blade 60, a blade through hole 69. The blade 60 may, in some embodiments, be asymmetrical about the blade centerline 61; for example, in a particular embodiment, the left chamfer angle 67 may be different from the right chamfer angle 68.

In other embodiments the left blade edge 62 may be shaped differently than the right blade edge 66 so that if the blade were folded on the blade centerline 61, the edges would not be mirror images of each other. This asymmetry could be in the curvature of the edges of the blade 60, in cut outs, serrations, or other differences.

Further, and with reference to FIG. 5, in one exemplary embodiment, the body 10 may optionally include a first ballast chamber 75 behind and proximate to the front hook anchor 72. Further, in this exemplary embodiment, the body 10 may optionally include a second ballast chamber 77 before and proximate to the front hook anchor 72. In particular embodiments, the first ballast chamber 75 or the second ballast chamber 77 or both or neither may contain ballast balls (not shown) which weight, stabilize, or balance the floating stickbait with hanging blade. In some embodiments, the ballast balls (not shown) are steel balls or tungsten balls. In some embodiments, the ballast balls (not shown) may be sized to move freely inside the first ballast chamber 75 and/or second ballast chamber 77, which may produce a rattle sound that attracts fish. The optional ballast chambers may be sized to fit either a single ballast ball or multiple ballast balls.

Numerous variations of this exemplary embodiment are possible. Each of the components and the many variations are now described in detail.

The body 10 may be any suitable fishing lure body. In a preferred embodiment the body 10 is formed of hard plastic. In one preferred embodiment, the body 10 may be shaped to mimic a natural minnow. In a specific embodiment, the body 10 may be approximately 4.5 inches long and may have a tapered shape that may be largest approximately 1.5 inches from the front, at which point the body 10 may be approximately 0.75 inches tall and approximately 0.63 inches wide. In a different specific embodiment, the body 10 may be approximately 3.5 inches long and may have a tapered shape that is largest approximately 1.2 inches from the front, at which point the body 10 may be approximately 0.69 inches tall and approximately 0.56 inches wide. In a different embodiment, the body 10 may be shaped to mimic a different natural prey, like a frog or mouse. In a different embodiment, the body 10 may be formed of soft plastic. In a different embodiment, the body 10 may be formed of multiple sections, with some sections of hard plastic and other sections of soft plastic.

The length of the body 10 may be between approximately 10 inches and approximately 2.0 inches, more preferably between approximately 7.0 inches and approximately 3.0 inches, and most preferably between approximately 5.0 inches and approximately 3.0 inches.

In some embodiments the body 10 may comprise other features that attract fish. In a preferred embodiment the body 10 may be colored or molded to mimic natural prey. In a specific embodiment, the body 10 may have eyes, natural coloration, scales, and fins that may mimic a natural minnow molded and colored on the exterior of the body 10. In a different embodiment, the body 10 may be colored or molded to mimic other natural prey, like a frog or mouse. In a different embodiment, the body 10 may be colored or molded in any way that attracts fish, for example with bright or contrasting colors.

Figure 6:
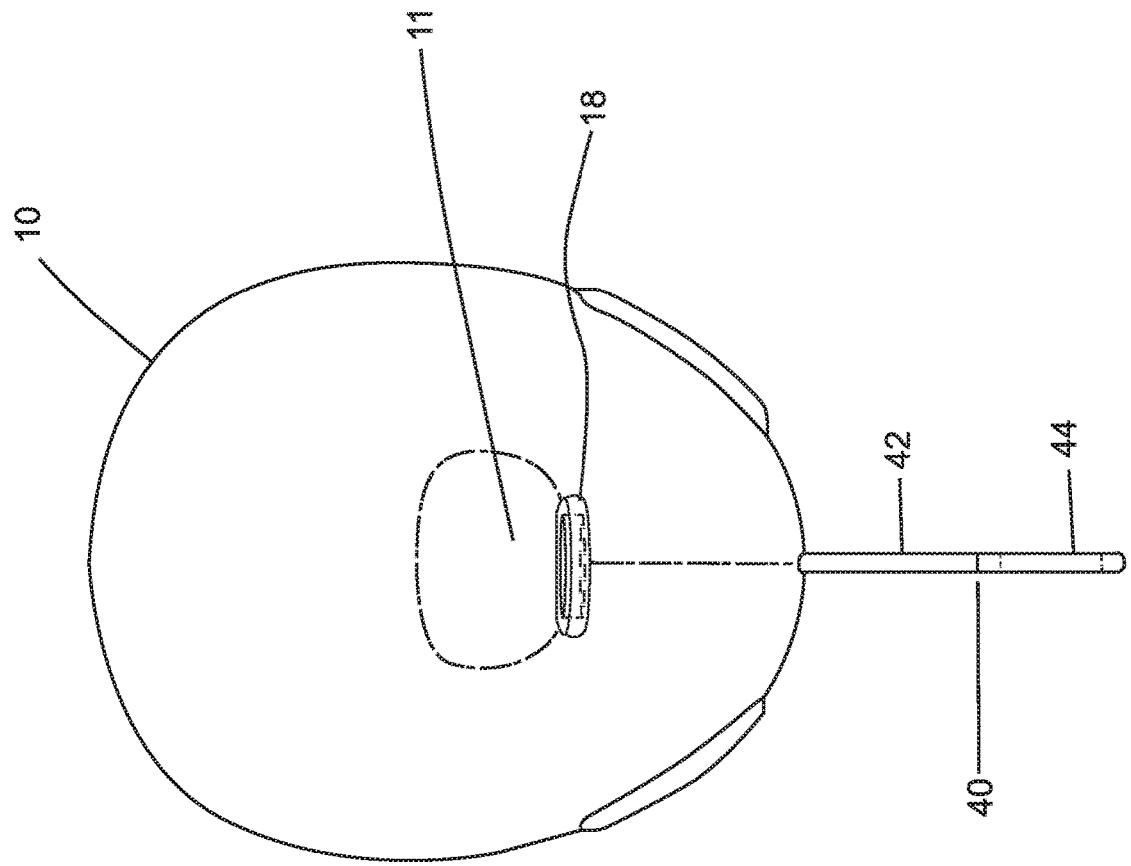
FIG. 6: A front view of the body and blade support pin of the floating stickbait with hanging blade of FIG. 2.
Figure 7:
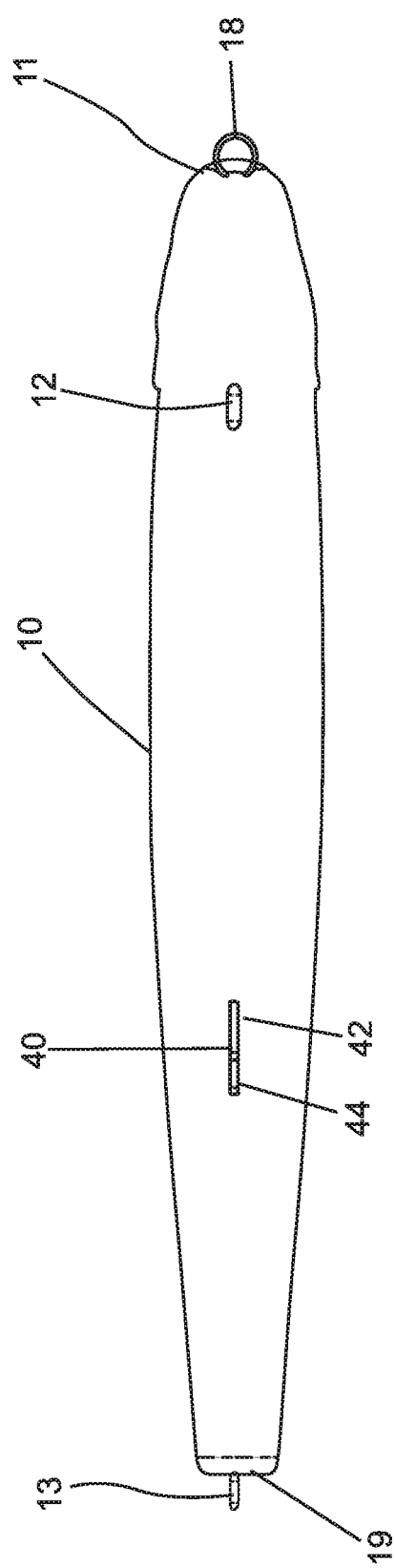
FIG. 7: A bottom view of the body and blade support pin of the floating stickbait with hanging blade of FIG. 2.
Figure 8:
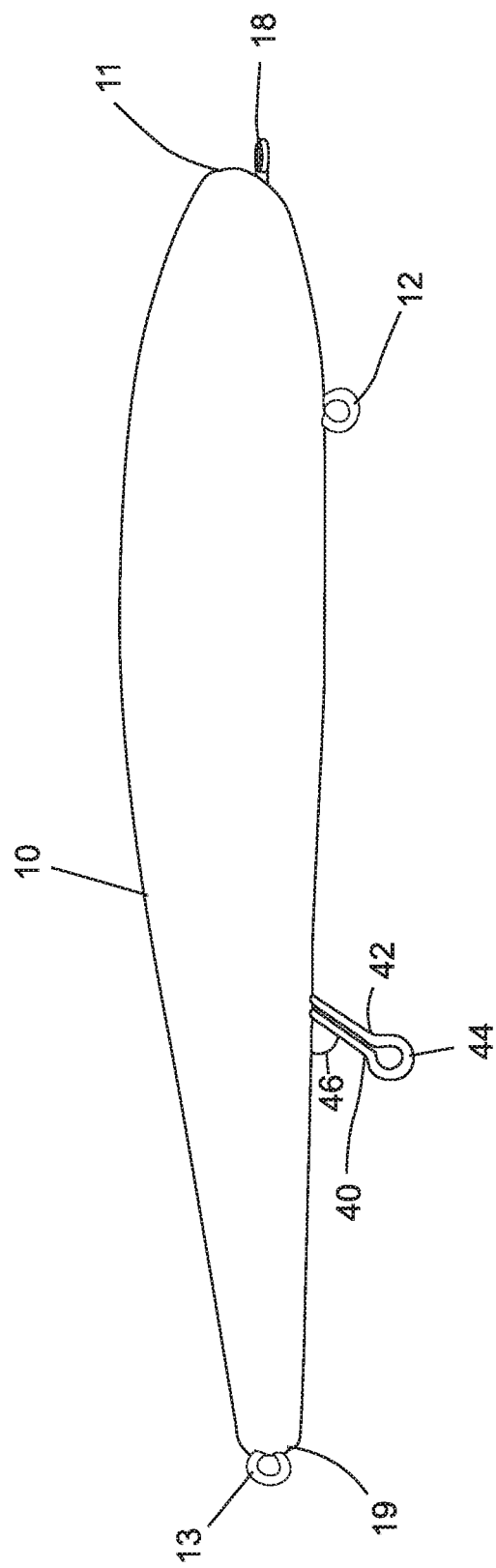
FIG. 8: A side view of the body and blade support pin of the floating stickbait with hanging blade of FIG. 2.

The body 10 may be attached to fishing line (not shown) by any suitable mechanism. In some embodiments, the body 10 may be attached to fishing line (not shown) by a line attachment mechanism 18. In some embodiments the line attachment mechanism 18 may be positioned at the front end 11, as shown in FIG. 6. Further, in some embodiments, the line attachment mechanism 18 may be secured to the body 10 by a line anchor 78 molded internal to the body 10 as shown in FIG. 5. In one embodiment, the line attachment mechanism 18 may be an eye ring. In a particular embodiment, the line attachment mechanism 18 may be a metal eye ring with diameter approximately 0.13 inches and oriented horizontally, as shown in FIG. 7.

The front hook 20 and the rear hook 30 may be any suitable fishing hooks. In a preferred embodiment, both the front hook 20 and the rear hook 30 may be round-bend treble hooks. In one exemplary embodiment, both the front hook 20 and the rear hook 30 may be approximately a size 4 treble hook with standard shank and standard-gauge wire. Depending on the size and intended use of the floating stickbait with hanging blade, the front hook 20 and the rear hook 30 may be different sizes and gauges; or they may be single hooks, double hooks, or other hooks.

The front hook 20 and the rear hook 30 may be attached to the body 10 by any suitable attachment mechanism. In one embodiment the front hook 20 may be attached to the body 10 by a front hook attachment mechanism 12. In a specific embodiment, the front hook attachment mechanism 12 may be an eye ring which is secured to the body 10 at a front hook anchor 72 (see FIG. 5) molded internal to the body 10 proximate the front end 11. In a particular embodiment, the front hook attachment mechanism 12 may be an eye ring with a diameter of approximately 0.13 inches. In a particular embodiment, the front hook anchor 72 may be positioned at the bottom center of the body 10, approximately 0.75 inches behind the front end 11, as shown in FIG. 5. In some embodiments, the front hook anchor 72 may be positioned between approximately 0.25 inches and approximately 1.5 inches behind the front end 11, and more preferably between approximately 0.5 inches and approximately 1.0 inches behind the front end 11.

Similarly, in one embodiment, the rear hook 30 may be attached to the body 10 by a rear hook attachment mechanism 13. In a specific embodiment, the rear hook attachment mechanism 12 may be an eye ring which may be secured to the body 10 at a rear hook anchor 73 (see FIG. 5) molded internal to the body 10 proximate the rear end 19. In a particular embodiment, the rear hook attachment mechanism 12 may be an eye ring with a diameter of approximately 0.13 inches. In a particular embodiment, the rear hook anchor 73 may be positioned at the rear end 19, as shown in FIG. 5.

In some embodiments, the front hook 20 and front hook attachment device 12 may be coupled together by a front hook coupler 21. In a particular embodiment, the front hook coupler 21 may be a split ring. In a specific embodiment, the front hook coupler 21 may be a metal split ring with a diameter of approximately 0.25 inches, as shown in FIG. 1. In other embodiments, the front hook 20 may attach directly to the front hook attachment 12 without an intervening front hook coupler 21. Likewise, in some embodiments, the rear hook 30 and the rear hook attachment device 13 may be coupled together by a rear hook coupler 31. In a specific embodiment, the rear hook coupler 31 may be a split ring. In a particular embodiment, the rear hook coupler 31 may be a metal split ring with a diameter of approximately 0.25 inches, as shown in FIG. 1. In other embodiments, the rear hook 30 may attach directly to the rear hook attachment mechanism 13 without an intervening rear hook coupler 31.

The blade 60 may be any suitable fishing blade. For examples, in some embodiments, the blade 60 may be a Colorado blade, an Indiana blade, an Oklahoma blade, a french blade, an inline blade, a willow blade, a swing blade, a royal blade, a whiptail blade, a chopper blade, or any modification of the foregoing. In some embodiments, the blade 60 may also be creased, hammered, fluted, serrated, rippled, wet-look, or luminous. In some embodiments, the blade 60 may be a sheet of metal or hard plastic. In a preferred embodiment, the blade 60 may be a sheet of shiny, reflective metal. For examples, in some embodiments, the blade 60 may be a sheet of brass, gold, nickel, silver, or copper. Further, in some embodiments, the blade 60 may be enhanced with fish-attracting finishes. For examples, in some embodiments, the blade 60 may be enhanced with gold plating, nickel plating, silver plating, a hammered finish, a wet-look finish, or a luminous finish.

Figure 11B:
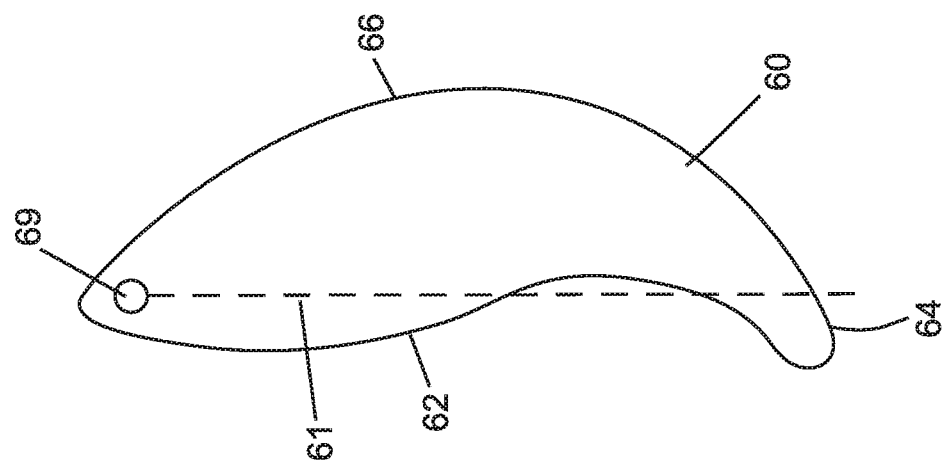
FIG. 11B: A front view of the blade of one embodiment of the floating stickbait with hanging blade.
Figure 11A:
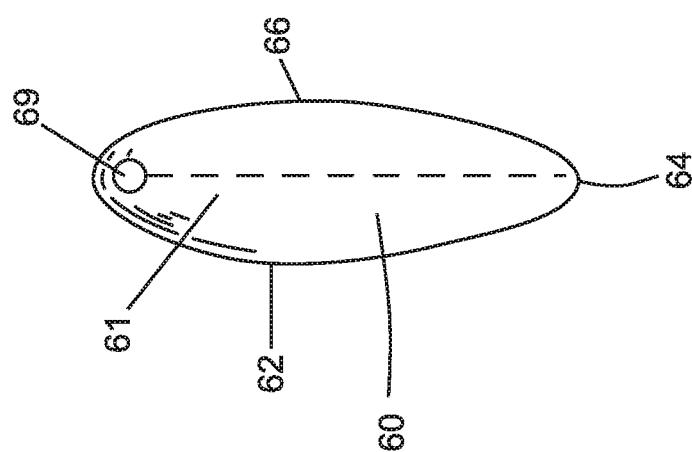
FIG. 11A: A front view of the blade of one embodiment of the floating stickbait with hanging blade.

In some embodiments, as shown in FIG. 11A, the shape of the blade 60 may be defined by a left blade edge 62, a bottom blade edge 64, and a right blade edge 66. In other embodiments as shown, for example, in FIGS. 9A-D and 10A-D—the shape of the blade 60 may be defined by a left blade edge 62, a left blade chamfer 63, a bottom blade edge 64, a right blade chamfer 65, and a right blade edge 66. In some embodiments the left blade chamfer 63 may be separated from the right blade chamfer 65 by a blade shoe length. Additionally, in some embodiments, the blade 60 may have a blade through hole 69 proximate the top of the blade 60. Different shapes of the blade 60 may impart different motions to the floating stickbait with hanging blade, because of the different ways that waterflow may be affected by differently shaped blades. In some embodiments, the blade 60 may be symmetrical with respect to the blade centerline 61, such that the left blade edge 62 is a mirror image, with respect to the blade centerline 61, of the right blade edge 66.

But in some embodiments, the blade 60 may be asymmetrical with respect to the blade centerline 61. In some embodiments, the left blade edge 62 might not be a mirror image of the right blade edge 66. In some embodiments, the left blade chamfer 63 might not be a mirror image of the right blade chamfer 65. In some embodiments, the bottom blade edge 64 might not be symmetrical with respect to the blade centerline 61. In some embodiments, there may be some combination of any of the foregoing.

A blade 60 that is asymmetrical with respect to the blade centerline 61 may resist flowing through the water differently on either side of the blade centerline 61. So when the floating stickbait with hanging blade is retrieved, a blade 60 that is asymmetrical with respect to the blade centerline 61 may impart an erratic side-to-side motion (or zig-zag motion) to the floating stickbait with hanging blade. So, depending on the intended use of the floating stickbait with hanging blade, some embodiments may include a blade 60 that is asymmetrical with respect to the blade centerline 61.

In embodiments with a blade 60 that is asymmetrical with respect to the blade centerline 61, the asymmetry may be achieved by any suitable design. In one preferred embodiment, shown in FIGS. 9A-D and 10A-D, the blade 60 may have a shape defined by a left blade edge 62, a left blade chamfer 63, a bottom blade edge 64, a right blade chamfer 65, and a right blade edge 66, wherein the shape of the left blade chamfer 63 may be defined by a left chamfer angle 67 and the shape of the right blade chamfer 65 may be defined by a right chamfer angle 68 which may be different from the left chamfer angle 67, and wherein the left blade chamfer 63 is separated from the right blade chamfer 65 by a blade shoe length. In such an embodiment, if the left chamfer angle 67 is different from the right chamfer angle 68, then the blade 60 would be asymmetrical with respect to the blade centerline 61, as shown in FIG. 10A. In a more preferred embodiment, the left chamfer angle 67 may be between approximately 34 degrees and approximately 49 degrees, the right chamfer angle 68 may be between approximately 50 degrees and approximately 65 degrees, and the blade shoe length may be between approximately 0.10 inches and approximately 0.50 inches. In one exemplary embodiment, the left chamfer angle 67 may be between approximately 39 degrees and approximately 44 degrees, the right chamfer angle 68 may be between approximately 53 degrees and approximately 58 degrees, and the blade shoe length may be between approximately 0.20 inches and approximately 0.40 inches. In a particular embodiment, the left chamfer angle 67 might be approximately 41 degrees, the right chamfer angle 68 might be approximately 54 degrees, and the blade shoe length might be approximately 0.30 inches.

In another preferred embodiment, the blade 60 may have a shape defined by a left blade edge 62, a left blade chamfer 63, a bottom blade edge 64, a right blade chamfer 65, and a right blade edge 66, wherein the shape of the left blade chamfer 63 may be defined by a left chamfer angle 67 and the shape of the right blade chamfer 65 may be defined by a right chamfer angle 68 which may be different from the left chamfer angle 67, and wherein the left blade chamfer 63 is separated from the right blade chamfer 65 by a blade shoe length. In such an embodiment, if the left chamfer angle 67 is different from the right chamfer angle 68, then the blade 60 would be asymmetrical with respect to the blade centerline 61, as shown in FIG. 10A. In a more preferred embodiment, the left chamfer angle 67 may be between approximately 34 degrees and approximately 48 degrees, the right chamfer angle 68 may be between approximately 49 degrees and approximately 63 degrees. In one exemplary embodiment, the left chamfer angle 67 may be between approximately 39 degrees and approximately 44 degrees, the right chamfer angle 68 may be between approximately 52 degrees and approximately 57 degrees. In a particular embodiment, the left chamfer angle 67 might be approximately 41 degrees, the right chamfer angle 68 might be approximately 55 degrees.

In another embodiment, the blade 60 may have a shape defined by a left blade edge 62, optionally a left blade chamfer 63, a bottom blade edge 64, optionally a right blade chamfer 65, and a right blade edge 66, wherein the bottom blade edge 64 might not be symmetrical with respect to the blade centerline 61. In such an embodiment, if the bottom blade edge 64 is not symmetrical with respect to the blade centerline 61, then the blade 60 would asymmetrical with respect to the blade centerline 61. In some embodiments, as shown in FIGS. 9A-D and 10A-D, the distance from the blade centerline 61 to the left end of the bottom blade edge 64 may be different than the distance from the blade centerline 61 to the right end of the bottom blade edge 64. In other embodiments, such as the one shown in FIG. 11B, the blade 60 may have a left blade edge 62 that may cross the blade centerline 61 (treating as the blade centerline 61 a vertical line from the blade through hole 69).

Figure 9C:
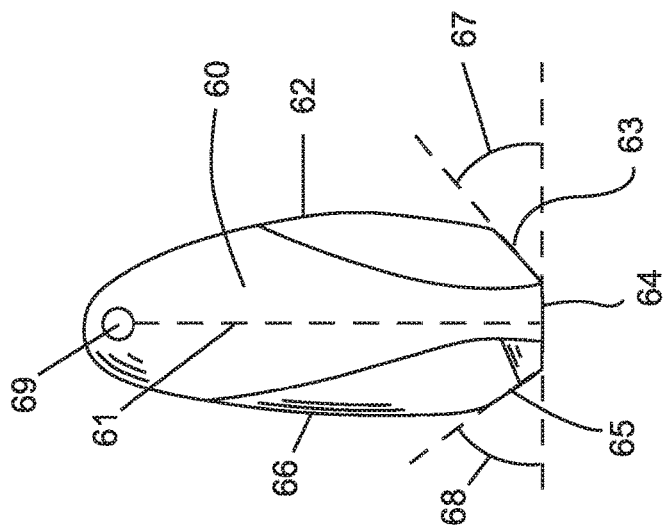
FIG. 9C: A back view of the blade of FIG. 9A, with shading.
Figure 9D:
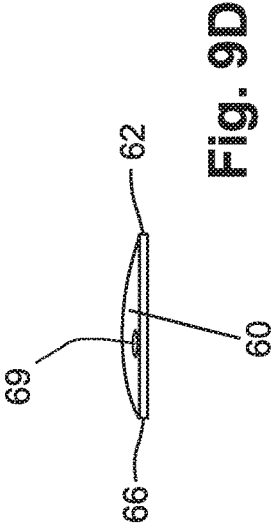
FIG. 9D: A side view along the short bottom side of the blade of FIG. 9A, with shading.
Figure 9B:
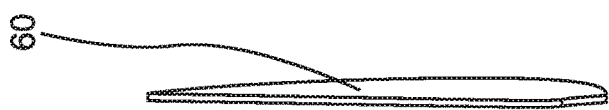
FIG. 9B: A side view along the long side of the blade of FIG. 9A, with shading.
Figure 9A:
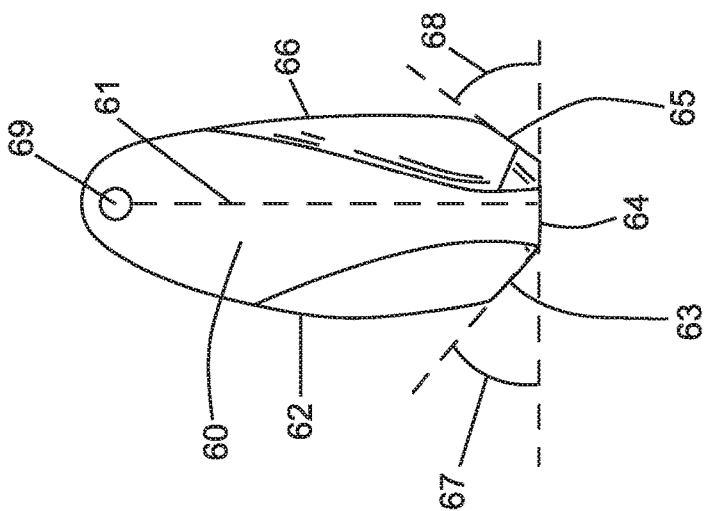
FIG. 9A: A front view of one embodiment of a blade useable with the floating stickbait with hanging blade, with shading.

In another embodiment, and with reference to FIGS. 9A-D and 10A-D, the blade 60 may have a shape defined by a left blade edge 62, optionally a left blade chamfer 63, a bottom blade edge 64, optionally a right blade chamfer 65, and a right blade edge 66, wherein the blade 60 may be cupped to be convex towards the front of the blade 60 by a blade depth. In some embodiments, the blade depth may be between approximately 0.063 inches and approximately 0.13 inches. In a particular embodiment, as shown in FIGS. 9A-D and 10A-D, the blade depth may be approximately 0.094 inches. In a particular embodiment the peak of convexity of the blade 60 may be positioned to the left or to the right the blade centerline 61, as shown in FIGS. 9A and 10A, in which embodiment the blade 60 consequently may be asymmetrical with respect to the blade centerline 61. In a different particular embodiment—shown most clearly in FIGS. 10A and 10C—the curvature of the blade 60 may be asymmetrical with respect to the blade centerline 61 such that the left blade bevel 95 is smaller than the right blade bevel 97. In such an embodiment the blade 60 would consequently be asymmetrical with respect to the blade centerline 61. In a specific embodiment, the blade 60 may have a curvature as depicted in FIGS. 9A-D and 10A-D. In some embodiments, only one of the two sides of the blade 60 has a blade bevel. For example, in some embodiments the blade 60 comprises a left blade bevel 95, but not a right blade bevel 97; in other embodiments, the blade 60 comprises a right blade bevel 97, but not a left blade bevel 95.

One skilled in the art will recognize other shapes of the blade 60 that are asymmetrical with respect to the blade centerline 61 such that the blade 60 may impart fish-attracting motion to the floating stickbait with hanging blade as it is retrieved. One skilled in the art will also understand other shapes of the blade 60 such that the blade 60 may impart fish-attracting motion to the floating stickbait with hanging blade.

The blade 60 may be attached to the body 10 by a blade support pin 40. In preferred embodiments, the blade support pin 40 may be positioned on the bottom of the body 10 between the front hook 20 and rear hook 30. In some embodiments, the blade support pin 40 may be secured to the body 10 at the blade anchor 74. In other embodiments, the blade support pin 40 may be molded directly onto and as an appendage of the body 10. As shown in FIG. 5, the blade support pin 40 may, in some embodiments, comprise a closed section (the blade support pin bar 42) and an open section (the blade support pin eye 44). In some embodiments, the blade support pin 40 may be made of rigid metal. In some embodiments the blade support pin eye 44 may have a diameter of between approximately 0.25 inches and approximately 0.050 inches, and more preferably approximately 0.13 inches.

Positioning the blade support pin 40 and the blade 60 rearwardly may impart erratic motion to the lure. Generally, the farther back the blade support pin 40 and the blade 60 are positioned, the more erratic may be the motion imparted to the lure when retrieved. The ballast balls (not shown) may add weight to the forward part of the body 10, which may help stabilize the lure. In some embodiments, the blade support pin 40 may be positioned in front of the rear hook 30 by the rear hook-to-pin distance 34 (shown in FIG. 12A-B). In some embodiments, the rear hook-to-pin distance 34 may be between approximately 10% and approximately 50% of the length of the body 10, more preferably between approximately 15% and approximately 45% of the length of the body 10, and most preferably between approximately 20% and approximately 40% of the length of the body 10. In a particular embodiment, shown in FIG. 12A-B, the rear hook-to-pin distance 34 may be approximately 1.5 inches, which may be about 33% of the length of the body 10 which may be about 4.5 inches.

In some embodiments, the blade support pin 40 may extend from the bottom of the body 10 between approximately 0.25 inches and approximately 1.5 inches, as measured along the blade support pin 40. In preferred embodiments, the blade support pin 40 may extend from the bottom of the body 10 between approximately 0.30 inches and approximately 0.60 inches, as measured along the blade support pin 40. In a specific preferred embodiment, the blade support pin 40 may extend from the bottom of the body 10 approximately 0.45 inches, as measured along the blade support pin 40. In some embodiments, the blade support pin 40 may extend from the bottom of the body 10 at a blade support pin angle 46 (see FIG. 1). In preferred embodiments, the blade support pin angle 46 may be between approximately 30 degrees and approximately 90 degrees. In a more preferred embodiment, the blade support pin angle 46 may be between approximately 40 degrees and approximately 60 degrees. In more preferred embodiments, the blade support pin angle 46 may be between approximately 45 degrees and approximately 55 degrees. In a specific embodiment, as shown in FIG. 1, the blade support pin angle 46 may be approximately 50 degrees.

In some embodiments, the blade 60 may attach directly to the blade support pin eye 44 through the blade through hole 69. In other embodiments, the blade 60 may be coupled to the blade support pin 40 by a blade swivel 50. In preferred embodiments, the blade swivel 50 may be a roller swivel allowing a full range of motion. In a specific embodiment, as shown in FIG. 1, the blade swivel 50 may be approximately a size 7 roller swivel. In some embodiments, a swivel blade ring 56 may couple the blade swivel 50 to the blade 60 through the blade through hole 69, and a swivel pin ring 54 couples the blade swivel 50 to the blade support pin 40 through the blade support pin eye 44. In a specific embodiment, the swivel blade ring 56 and the swivel pin ring 54 may be metal split rings with diameters approximately 0.19 inches.

Figure 12A:
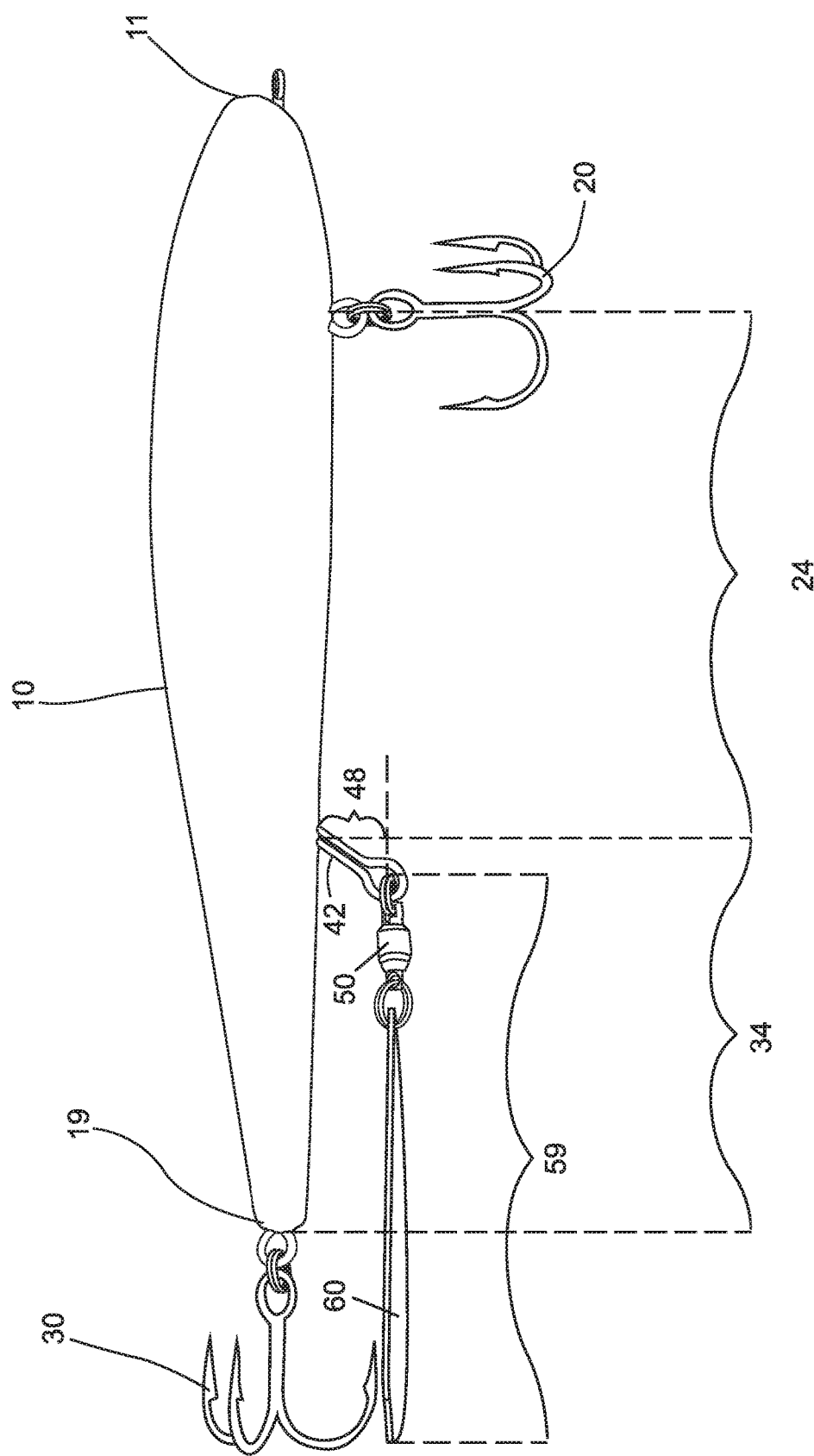
FIG. 12A: A side view of the floating stickbait with hanging blade showing the rear hook, blade, and blade swivel oriented as they might be while the floating stickbait with hanging blade is retrieved.

The relative dimensions and positions of the body 10, rear hook 30, blade support pin 40, blade swivel 50, and blade 60, along with the blade support pin angle 46, can be important aspects for certain embodiments of the lure. In some embodiments, the relative dimensions and positions may be such that the blade 60 may periodically contact the body 10 and/or rear hook 30. For example, in some embodiments, the blade swivel 50 and blade 60 may be long enough—and the blade 60 may be wide enough and the blade support pin 40 short enough—so that the blade 60 may periodically knock against the body 10 when the lure is retrieved (as shown in FIG. 12B), which may make fish-attracting sound. In some exemplary embodiments, as shown in FIG. 12B, the blade support pin cathetus 48 may be less than half the blade width. In some embodiments, as shown in FIG. 12B, the blade width may be between approximately 200% and approximately 300% of the blade support pin cathetus 48. In a specific embodiment, as shown in FIGS. 12A-B, the blade support pin cathetus 48 may be approximately 0.30 inches, and the blade width may be between approximately 0.60 inches and approximately 0.90 inches, and more preferably approximately 0.75 inches.

In some embodiments, the blade support pin 40, blade swivel 50, and blade 60 may be short enough that they do not tangle with the rear hook 30 nor interfere with hookup with a fish. FIG. 12A shows a side view of an embodiment of the floating stickbait with hanging blade, with the rear hook 30, the blade swivel 50, and the blade 60 oriented as they might be while the floating stickbait with hanging blade is retrieved. In some embodiments, the rear hook 30, the blade support pin 40, the blade swivel 50, and the blade GO may be dimensioned and positioned such that the bottom blade edge 64 does not extend beyond the extremity of the rear hook 30 as the lure with hanging blade is retrieved. In other words, the blade 60 and optional swivel 50 may have a total length that does not extend from the blade support pin eye 40 beyond the rear hook 30 when retrieved. In some embodiments, the blade 60 and optional swivel 50 may have a total length that does extend from the blade support pin eye 40 beyond the rear hook 30 when retrieved. In some of those embodiments, the blade 60 and optional swivel 50 may have a total length that extends from the blade support pin eye 40 beyond the rear hook 30 by less than approximately 1.0 inch (preferably by less than approximately 0.50 inches, and more preferably by less than approximately 0.25 inches) when retrieved.

In a specific embodiment, as shown in FIGS. 12A-B, the rear hook 30 may be approximately a size 4, standard-shank, treble hook and may be attached at the rear end 19; the length of the body 10 may be approximately 4.5 inches; the rear hook-to-pin distance 34 may be approximately 1.5 inches; the front hook-to-pin distance 24 may be approximately 2.3 inches; the blade support pin 40 may extend approximately 0.45 inches from the bottom of the body 10 as measured along the blade support pin 40; the blade support pin 40 may make a blade support pin angle 46 of approximately 50 degrees with the body 10; the blade swivel 50 may be approximately a size 7 roller swivel; the blade length may be approximately 1.7 inches as measured along the blade centerline 61; the blade width may be approximately 0.75 inches at the widest point of the blade 60; the total length which the blade 60 and swivel 50 extend from the blade support pin 40 may be approximately 2.3 inches; and the total distance from the blade support pin 40 to the end of the rear hook 30 when it is retrieved may be approximately 2.5 inches.

In another specific embodiment, the rear hook 30 may be approximately a size 6, standard-shank, treble hook and may be attached at the rear end 19; the length of the body 10 may be approximately 3.5 inches; the rear hook-to-pin distance 34 may be approximately 1.3 inches; the front hook-to-pin distance 24 may be approximately 1.2 inches; the blade support pin 40 may extend approximately 0.35 inches from the bottom of the body 10 as measured along the blade support pin 40; the blade support pin 40 may make a blade support pin angle 46 of approximately 50 degrees with the body 10; the blade swivel 50 may be approximately a size 10 roller swivel; the blade length may be approximately 1.4 inches as measured along the blade centerline 61; the blade width may be approximately 0.63 inches at the widest point of the blade 60; the total length which the blade 60 and swivel 50 extend from the blade support pin 40 may be approximately 1.9 inches; and the total distance from the blade support pin 40 to the end of the rear hook 30 when it is retrieved may be approximately 2.1 inches.

In some embodiments, a user may be able to adjust the distance by which the blade support pin 40 extends from the bottom of the body 10 as measured along the blade support pin 40. In some embodiments, a user may be able to adjust the blade support pin angle 46. In some embodiments, a user may be able to adjust the rear hook-to-pin distance 34. In some embodiments, a user may be able to adjust some combination of the foregoing.

One skilled in the art will recognize how to dimension and position the rear hook 30, the blade support pin 40, the blade swivel 50, and the blade 60 in other embodiments so that (i) the blade 60 may periodically knock against the body 10 and/or rear hook 30 to emit fish-attracting sound, (ii) the blade 60 and blade swivel 50 may not tangle in the rear hook 30 during casting or while the lure with hanging blade is retrieved, and/or (iii) the blade 60 may not overly interfere with hookup with a fish.

Preferably, the weight of the blade 60 and blade support pin 40 is such that body 10 of the lure with hanging blade is essentially horizontal in the water while at rest. More preferably, the weight of the blade 60 and blade support pin 40 is such that the body 10 of the floating stickbait with hanging blade version rests in the water with the rear end 19 of the body 10 lower than the front end 11 of the body 10. In other words, in a preferred embodiment, the front end 11 of the body 10—optionally, with ballast (not shown)—sits higher in the water than does the rear end 19 of the body 10. In some of these embodiments, this allows the floating stickbait with hanging blade either to create splash or to move erratically or both.

While the foregoing specification has described specific embodiments of this invention and many details have been put forth for the purpose of illustration, it will be apparent to those skilled in the art that the invention is susceptible to additional embodiments and that certain of the details described herein can be varied considerably without departing from the basic principles of the invention.

What is claimed is:

1. A fishing lure comprising:
    a floating, hard-plastic body, wherein the body is between approximately 3.0 inches and approximately 5.0 inches long, and wherein the body is shaped such that the body resembles a minnow;
    a front hook attached to the body proximate a front end of the body, wherein a first distance from the front hook to the front end of the body is less than 1 inch;
    a rear hook attached to the body at a rear end of the body;
    a support pin attached to a bottom of the body between the rear hook and the front hook, wherein the support pin is positioned a second distance from the rear end of the body that is between approximately 20% and approximately 40% of a first length of the body, wherein the support pin makes a rearward angle with the body of between approximately 45 degrees and approximately 55 degrees, and wherein a second length of the support pin is between approximately 0.30 inches and approximately 0.60 inches;
    a swivel attached to the bottom of the blade support pin;
    a blade attached to the bottom of the swivel, wherein the blade is asymmetrical with respect to a blade centerline; and
    one or more ballast weights proximate the front end of the body.

2. The fishing lure of claim 1, wherein the blade is cupped to be convex toward a front of the blade, wherein the blade has a right side of the blade having a right chamfer angle and a left side of the blade having a left chamfer angle, and wherein the left chamfer angle is different from the right chamfer angle.

3. The fishing lure of claim 2, wherein the blade is cupped to a depth of between approximately 0.063 inches and approximately 0.13 inches, wherein the left chamfer angle is between approximately 39 degrees and approximately 44 degrees, and wherein the right chamfer angle is between approximately 53 degrees and approximately 58 degrees.

4. The fishing lure of claim 3, wherein the blade has a width of the blade between approximately 200% and approximately 300% of a vertical distance by which the support pin descends from the body, and wherein the blade does not extend beyond an end of the rear hook when retrieved.

5. A fishing lure comprising:
- a floating body, wherein the body is between approximately 2 inches and approximately 10 inches long;
- a front hook attached to the body proximate a body front end;
- a rear hook attached to the body at a body rear end;
- a support pin attached to the bottom of the body between the rear hook and the front hook, wherein the support pin is positioned nearer the rear hook than the front hook, and wherein the support pin makes a rearward angle with the body that is not greater than approximately 90 degrees;
- a blade attached to the support pin, wherein the blade is cupped, and wherein the blade is asymmetrical with respect to a blade centerline.

6. The fishing lure of claim 5, wherein the support pin is positioned a distance from the body rear end that is between approximately 15% and approximately 45% of a length of the body.

7. The fishing lure of claim 5, wherein the maximum width of the blade is more than approximately 200% of the vertical distance by which the support pin descends from the body.

8. The fishing lure of claim 5, wherein the blade does not extend more than 0.25 inches beyond an end of the rear hook when retrieved.

9. The fishing lure of claim 8, wherein the blade does not extend beyond the end of the rear hook.

10. The fishing lure of claim 9, wherein the wherein the blade has chamfers on a left blade side and a right blade side.

11. The fishing lure of claim 10, wherein the blade has a left chamfer angle and a right chamfer angle and wherein the left chamfer angle is different from the right chamfer angle.

12. The fishing lure of claim 11, wherein a convex curvature of the blade is asymmetrical with respect to the blade centerline.

13. A fishing lure comprising:
- a body;
- a front hook attached to the body;
- a rear hook attached to the body;
- a support pin positioned between the front hook and rear hook;
- a blade attached to the support pin; and
- the blade has a width greater than approximately 200% of a vertical distance by which the support pin descends from the body.

14. The fishing lure of claim 13, wherein the support pin makes a rearward acute angle with respect to the body.

15. The fishing lure of claim 13, wherein the blade does not extend more than 1.0 inches beyond an end of the rear hook when retrieved.

16. The fishing lure of claim 13, wherein the blade is asymmetrical with respect to a blade centerline.

17. The fishing lure of claim 16, wherein the blade is convex and wherein the convexity of the blade is asymmetrical with respect to the blade centerline.

18. The fishing lure of claim 17, wherein the blade has a left bevel face and a right bevel face and wherein the left bevel face is a different shape than the right bevel face.

19. The fishing lure of claim 18, wherein the left bevel face is a different size than the right bevel face.

* * * * *